US007877386B2

(12) United States Patent
Shurtleff et al.

(10) Patent No.: US 7,877,386 B2
(45) Date of Patent: Jan. 25, 2011

(54) BUSINESS OBJECT SEARCH METHOD PROCESS AND PRESENTATION

(75) Inventors: Mark Shurtleff, Emeryville, CA (US); Milind Madhusudan Sawant, Pleasanton, CA (US); Michael P. Sverdlov, Alameda, CA (US); Chuaoyuan Wang, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 11/153,693

(22) Filed: Jun. 14, 2005

(65) Prior Publication Data

US 2006/0282427 A1   Dec. 14, 2006

(51) Int. Cl.
*G06F 17/30* (2006.01)
(52) U.S. Cl. ..................................................... 707/736
(58) Field of Classification Search ........................ None
See application file for complete search history.

(56) References Cited

U.S. PATENT DOCUMENTS

| | | | | | |
|---|---|---|---|---|---|
| 6,137,488 | A | * | 10/2000 | Kraft et al. ................... | 715/866 |
| 6,567,846 | B1 | * | 5/2003 | Garg et al. ................... | 709/218 |
| 6,711,565 | B1 | * | 3/2004 | Subramaniam et al. ........ | 707/3 |
| 6,782,383 | B2 | * | 8/2004 | Subramaniam et al. ........ | 707/3 |
| 6,789,252 | B1 | * | 9/2004 | Burke et al. ................. | 717/100 |
| 7,031,961 | B2 | * | 4/2006 | Pitkow et al. ................. | 707/4 |
| 7,113,941 | B2 | * | 9/2006 | Arend et al. .................. | 707/3 |
| 2002/0149614 | A1 | * | 10/2002 | Biebesheimer et al. ...... | 345/738 |
| 2003/0229646 | A1 | * | 12/2003 | Bach et al. .............. | 707/103 R |
| 2005/0086239 | A1 | * | 4/2005 | Swann et al. ................ | 707/100 |
| 2005/0197852 | A1 | * | 9/2005 | Gebhard et al. ................ | 705/1 |

OTHER PUBLICATIONS

"Inxight SmartDiscovery™: Discover the True Value of Information"; 2003, http://www.inxight.com/pdfs/SmartDiscovery_white_paper.pdf, 13 pages.
"SearchTools.com: Background Topics: Faceted Metadata Search and Browse"; http://www.searchtools.com/info/faceted-metadata.html, 5 pages.
Chen, Hao et al.; "Bringing Order to the Web: Automatically Categorizing Search Results"; http://research.microsoft.com/~sdumais/chi00.pdf, 9 pages.
"Vivisimo Clustering-automatic categorization and meta-search software"; http://vivisimo.com, 1 page.

* cited by examiner

*Primary Examiner*—Charles Rones
*Assistant Examiner*—Yuk Ting Choi
(74) *Attorney, Agent, or Firm*—Townsend and Townsend and Crew LLP

(57) ABSTRACT

A user uses a graphical user interface to configure a search process. One or more set up pages may be output to the user to allow the search process to be configured. Once the search process is defined, a graphical user interface is generated that provides the search process. A searcher can then use the interface to perform searches. A search page is provided that includes fields that were defined. When a search term is received, a search is performed according to a search definition. The search results are then returned according to how the search results were configured. For example, the search results may be returned in a stepped fashion. Additionally, a quick create option is provided on the search result page. This allows a user to create an entry that is classified according to the search definition for the field that was searched.

21 Claims, 17 Drawing Sheets

Search Role
General Options

702 {
- Description: RC Contact (D)
- Label: Contact
- Role Type ID: Contact
- Relationship Type: Contact / Company
- Relationship Type 2: Primary Contact / Company Apply SetID Security
- None
- Both BOs
- Primary BO
- Related BO Apply Application Security
- Primary BO
- Related BO Apply Controlling BO
- Primary BO
- Related BO Apply Filter BO
- Primary BO
- Related BO Filter Record
Quick Create Template
Secured Property
Maximum Rows: 50

[Save As]
}

Used in Search Definitions   Find | View All   First 1-4 of 4 Last

| Search Definition | |
|---|---|
| FS Modified Cust All Details | ✎ |
| RC Company with Contact | ✎ |
| RC Customer All Details | ✎ |
| FS Customer All Details | ✎ |

704

Field Selection

706 {

Primary | Additional

| Field | Related BO (708) | Search (710) | Result (712) | |
|---|---|---|---|---|
| Last Name | ☐ | ☑ | ☑ | ✎ |
| First Name | ☐ | ☑ | ☑ | ✎ |
| Name | ☑ | ☑ | ☑ | ✎ |
| Phone | ☐ | ☑ | ☑ | ✎ |
| Email | ☐ | ☑ | ☑ | ✎ |
| Address | ☐ | ☑ | ☑ | ✎ |
| City | ☐ | ☑ | ☑ | ✎ |

Criteria
General Options — 800

| | | |
|---|---|---|
| Description | RC Customer | |
| Label | Customer | |
| Search Definition | RC Customer All Details | |
| Search Definition 1 | RC Company with Contact | |
| Search Definition 2 | RC Person | |
| Search Definition 3 | RC Contact of Company | |
| Search Definition 4 | RC Person with PIN | |
| Search Definition 5 | RC Contact of Site | |

802 brackets the Search Definition rows.

☐ Enable Search Filter
☑ Show Search Operators
☑ Criteria Required

[Test BO Search]  [Save As]

Field Selection — Customize | Find | View All — First 1-10 of 14 Last

| Field Definition | Role Type ID | Enable Search 1 | Enable Search 2 | Enable Search 3 | Enable Search 4 | Enable Search 5 | |
|---|---|---|---|---|---|---|---|
| Name | Company | ☑ | ☐ | ☑ | ☐ | ☐ | |
| First Name | | ☐ | ☑ | ☑ | ☐ | ☐ | |
| Last Name | | ☐ | ☑ | ☑ | ☐ | ☑ | |
| Phone | | ☐ | ☑ | ☑ | ☐ | ☐ | |
| Email | | ☐ | ☑ | ☑ | ☐ | ☐ | |
| Address | | ☐ | ☑ | ☐ | ☐ | ☐ | |
| City | | ☐ | ☑ | ☐ | ☐ | ☐ | |
| State | | ☐ | ☑ | ☐ | ☐ | ☐ | |
| Postal | | ☐ | ☑ | ☐ | ☐ | ☐ | |
| Country | | ☐ | ☑ | ☐ | ☐ | ☐ | |

804 brackets the field rows. 806 brackets the first two columns; 808 brackets the Enable Search columns.

*FIG. 10*

Search For Customer — 1100

▽ Search

1102 {
- Company: begins with | M
- First Name: begins with
- Last Name: begins with
- Phone: begins with
- Email: =
- Address: begins with
- City: begins with
- State: =
- Postal: =
- Country: =
- PIN: =
- SIN: =
- Serial Number: =
- Agreement ID: =

[Search] [Clear] [Cancel]

—1104

—1106

⮕ Create Company With Contact

Search Results — View All — First ◁ 1-2 of 2 ▷ Last

1104 {

| Company | Address | City | State | Postal | Country | Phone |
|---|---|---|---|---|---|---|
| MMA Property Management Group — 1110 | 1200 Lake Drive, Circle Pines, MN, 55014, USA | Circle Pines | MN | 55014 | USA | 800/988-5644 |
| Madison Reese — 1112 | 7439 Greenville Street, Atlanta, GA, 23145, USA | Atlanta | GA | 23145 | USA | 246/412-8975 |

BUSINESS OBJECT SEARCH METHOD PROCESS AND PRESENTATION

BACKGROUND OF THE INVENTION

The present invention generally relates to search techniques and more specifically to techniques for providing a configurable search process of business objects.

The ability to efficiently locate a business entity with minimal information is very valuable for a company. The entity may be a person, company, contact, or any other entity type (e.g., a consumer or a site). Typically, a search interface is provided that allows users to search databases of entities.

During a product lifecycle, many different departments for a company may need to search for entities. For example, a product lifecycle may include an offer stage, sale stage, and support stage. During each of these stages, different departments of the company may have different search needs. For example, each department may need to search different entities and may desire different search pages. Also, different departments would like search results formatted differently. For example, the search results should be organized in a logical manner for each department that is easily and quickly scanned by a user.

Customization of search engines, however, is very inflexible for an end user. Typically, a programmer needs to hard code changes in a search engine in order to customize the engine for different departments. This is inconvenient and time-consuming for both the developer of the search engine and the end users. Also, because coding changes need to be performed, the customization often does not happen. Thus, end users are left with a search engine that is not tailored to their needs.

Accordingly, a search framework that is configurable and flexible is desirable.

BRIEF SUMMARY OF THE INVENTION

Embodiments of the present invention generally relate to a configurable search process of business objects.

In one embodiment, a user uses a graphical user interface to configure a search process. One or more set up pages may be output to the user to allow the search process to be configured. A field mapping setup page allows a user to define fields that can be used in the search process. A search definition page allows the user to define how the search is performed and how the search results will be outputted.

Once the search process is defined, a graphical user interface is generated that provides the search process. A searcher can then use the interface to perform searches. A search page is provided that includes the fields that were defined. When a search term is received, a search is performed according to the search definition. The search results are then returned according to how the search results were configured. For example, the search results may be returned in a stepped fashion. In this case, if an entity is selected, entities dependent upon the selected entity are returned. Additionally, a quick create option is provided on the search result page. This allows a user to create an entry that is classified according to the search definition for the field that was searched.

Accordingly, the search process is configurable by users. Search processes may be easily configured because a GUI is used. Thus, various users with different search needs may easily configure different search processes without making coding changes.

In one embodiment, a method for providing search results is provided. The method comprises: providing a search page including one or more fields, wherein one or more search definitions related to the one or more fields are user-configured using a graphical user interface; receiving a search term for at least one field in the one or more fields for a search; determining a list of objects based on a search definition that relates to the at least one field, the search definition associated with at least one role; and displaying the list of objects according to a user-defined search definition, the list of objects associated with the at least one role, the search definition being configured being user-defined using the graphical user interface.

In another embodiment, a search framework that allows a user to configure a search process is provided. The interface comprises: a field setup page configured to allow a user to define a field that can be used in the search process; a search definition setup page configured to allow the user to define a search definition that is used when a search in a field is performed, wherein the search definition is associated with a role; and a search association setup page configured to allow the user to associate the search definition with the field, wherein objects associated with the role for the search definition are searched when a search using the field is performed.

In yet another embodiment, an information storage medium having a plurality of instructions for providing search results is provided. The steps include: providing a search page including one or more fields, wherein one or more search definitions related to the one or more fields are user-configured using a graphical user interface; receiving a search term for at least one field in the one or more fields for a search; determining a list of objects based on a search definition that relates to the at least one field, the search definition associated with at least one role; and displaying the list of objects according to a user-defined search definition, the list of objects associated with the at least one role, the search definition being configured being user-defined using the graphical user interface.

A further understanding of the nature and the advantages of the inventions disclosed herein may be realized by reference of the remaining portions of the specification and the attached drawings.

BRIEF DESCRIPTION OF THE DRAWINGS

FIG. 8 depicts a quick create template definition set up page according to one embodiment of the present invention.

FIG. 9 depicts a role setup page according to an embodiment of the present invention.

FIG. 10 shows a search definition selection setup page according to one embodiment of the present invention.

FIG. 13 depicts another search page according to one embodiment of the present invention.

FIG. 14 depicts a quick create page that allows a user to enter an entry according to one embodiment of the present invention.

FIG. 15 shows a page with the stepped search results according to one embodiment of the present invention.

DETAILED DESCRIPTION OF THE INVENTION

Figure 1:
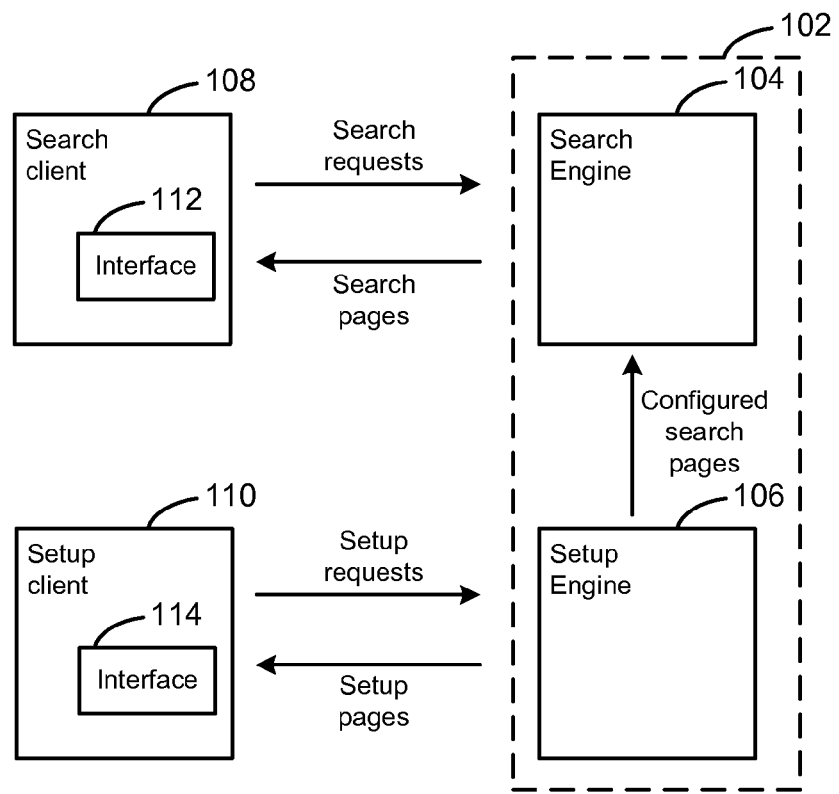
FIG. 1 depicts a system for providing a configurable search process according to one embodiment of the present invention.

FIG. 1 depicts a system 100 for providing a configurable search process according to one embodiment of the present invention. As shown, a search system 102 includes a search engine 104 and a search setup engine 106. Setup engine 106 is configured to interact with setup client 110 to configure a search process. Search engine 104 is configured to interact with search client 108 to perform searches.

Setup client 110 and search client 108 may be any computing device (and also may be the same computing device). Clients 110 and 108 include an interface 112 and 114, respectively. In one embodiment, interfaces 112 and 114 may be any interface that can display pages, such as an Internet browser, an application, etc.

Setup engine 106 is configured to output pages that allow a search process to be configured. For example, the pages may be displayed on interface 114. A user can then enter information that allows the search process to be configured. In one embodiment, a user may be a system administrator in charge of setting up a search process for a company. As will be described in more detail below, the user can configure which fields are available for a search, and also configure a search definition that is used to define how to perform the search and how to output search results.

A search process is then created and can be output on interface 112 of search client 108. A user, such as an end user or business user can then perform a search. Search engine 104 receives a search request and performs the search according to the search definition defined by the user. The search results are then outputted according to how they were configured.

The above search process can be continually reconfigured by a user. The changes are effected using the series of setup pages. These changes to the search process are made without making coding changes. Thus, the search process may be easily configured and also easily changed.

Figure 2:
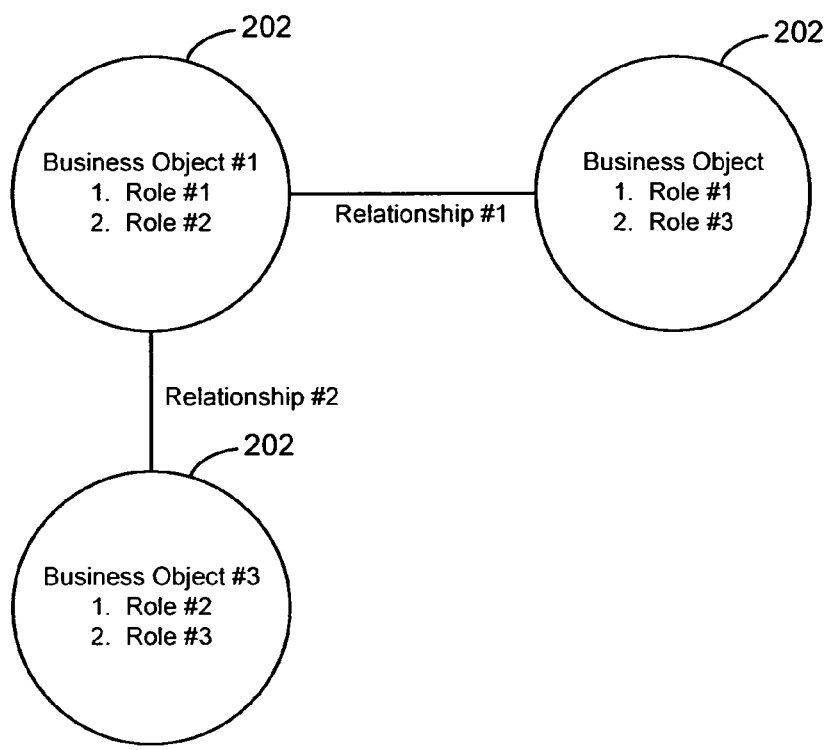
FIG. 2 depicts a business object model that may be searched according to one embodiment of the present invention.

FIG. 2 depicts a business object model 200 that may be searched according to one embodiment of the present invention. As shown, a plurality of business objects 202 are provided in model 200. A business object 202 may be an entity that can be searched. For example, a business object 202 may be a person, company, contact, or any other entity type (e.g., a consumer or a site).

Each business object 202 is associated with one or more roles. A role may be a category or classification for the business object 202. For example, a role may be company, person, etc. The business object may be broken down into other roles, such a company may have the roles of a non-profit, limited partnership, etc. Additionally, a person may be broken down into other roles, such as employee, contact, consumer, etc.

Each business object 202 also has attributes. Attributes are information about the object. For example, attributes may be a phone number, email, address, name, etc.

Multiple business objects 202 may be connected through relationships. For example, a company business object is related to all its employee business objects by the relationship of company/employee. Also, attributes may have relationships, such as a credit card account may be assigned to a company or a person.

Business object 200 may be searched using embodiments of the present invention. In one embodiment, multiple versions of model 200 may be created for searching among different entities. For example, different departments of a company may search different versions of model 200. For discussion purposes, it is assumed that a single model 200 is searched. Although the above model 200 is described as being searched, it will be recognized that any information may be searched using embodiments of the present invention.

Figure 3:
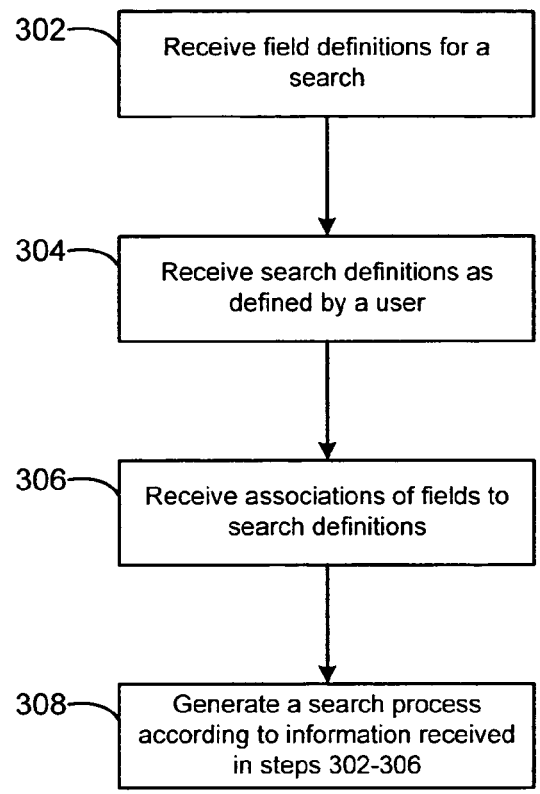
FIG. 3 depicts a simplified flowchart of a method for configuring a search process according to one embodiment of the present invention.

FIG. 3 depicts a simplified flowchart 300 of a method for configuring a search process according to one embodiment of the present invention. For the method, one or more pages may be outputted on interface 114 of setup client 110. A user may provide information to setup engine 106 using interface 114 to configure the search process.

In step 302, field definitions for the search process are received. The field definitions list fields that can be used to search business object model 200. The fields may correspond to different attributes that may be included in business objects 202. Examples of fields include name, phone number, address, job title, etc.

Figure 4:
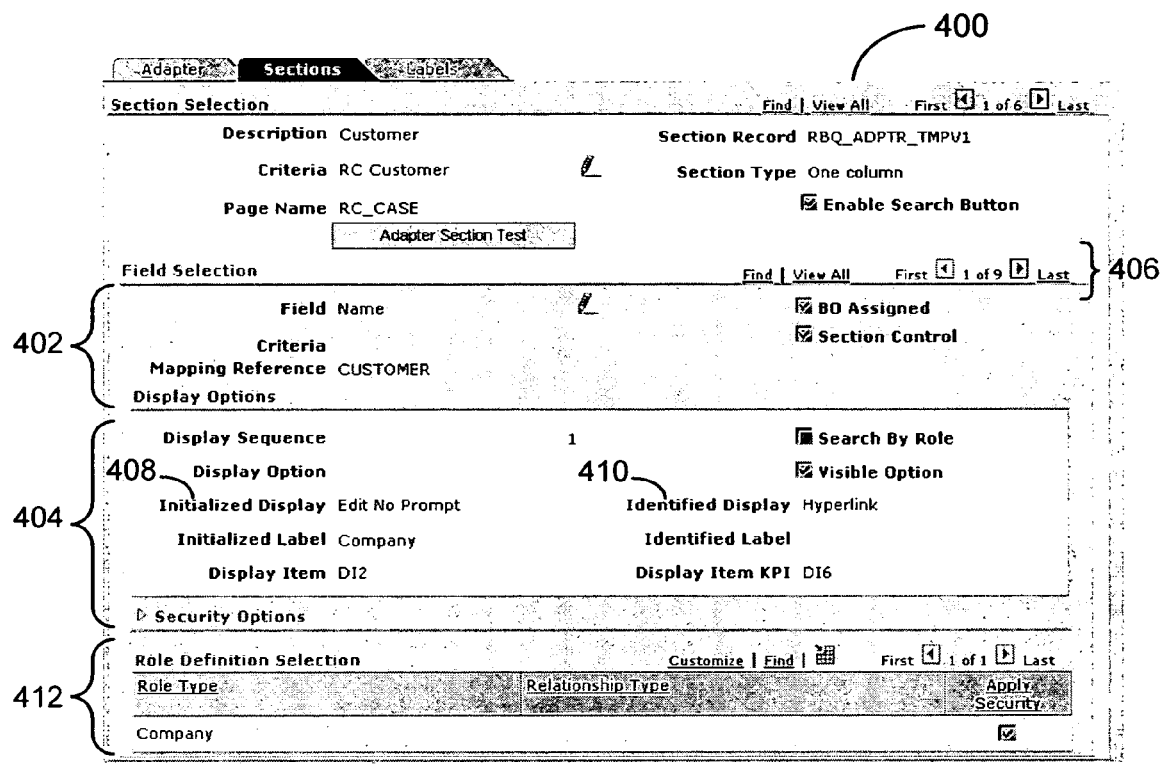
FIG. 4 depicts a setup page for defining fields according to one embodiment of the present invention.

FIG. 4 depicts a setup page 400 for defining fields according to one embodiment of the present invention. A Field Selection section 402 allows a user to select fields for the search process. The field shown is the Name field. Other fields may be defined by cycling through available fields using the first and last controls 406. As shown, nine fields may be defined.

A Display Options section 404 allows a user to define display options for the fields. A user thus chooses how each field is displayed, such as the sequence of the fields, the initial display, how entered information in the field is displayed, etc. As shown, an initialized display option 408 indicates the field will be displayed with no prompt but can be edited. Also, an identified display option 410 indicates that entered information will be displayed as a hyperlink. Other display options will also be contemplated.

Role Definition Selection section 412 allows a role to be assigned to a field. Section 412 defines a list of valid roles associated with this field. The roles shown can be selected and later used in a search using the field.

Figure 5:
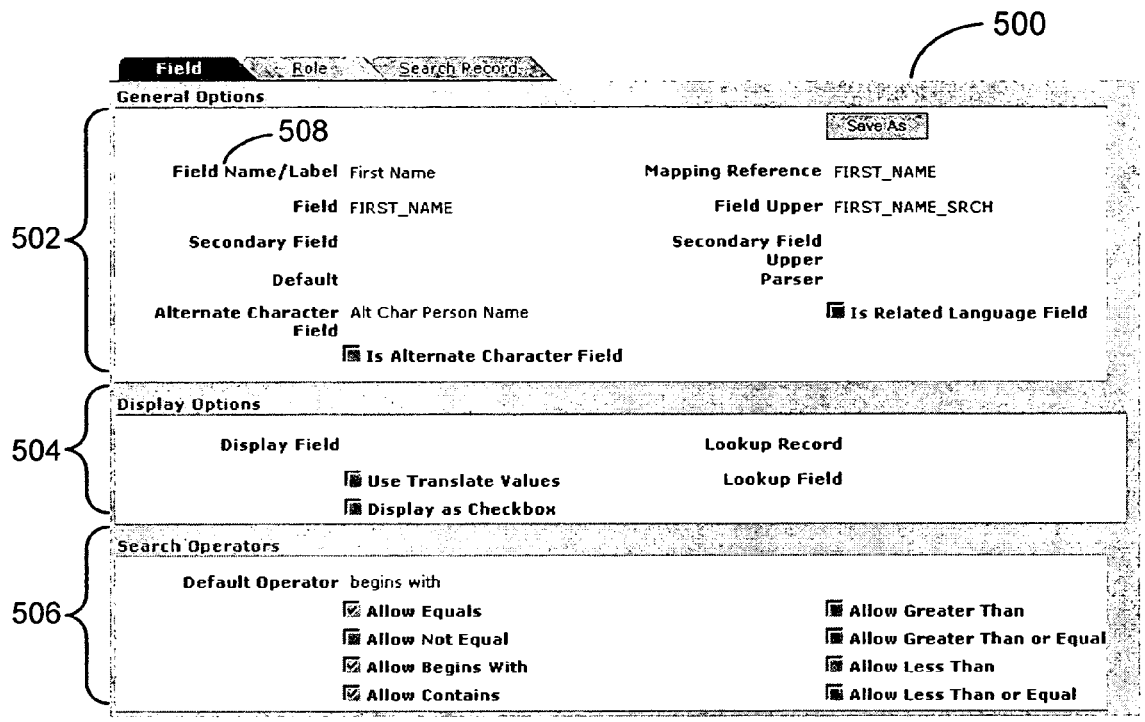
FIG. 5 shows another embodiment of a setup page for defining fields according to embodiments of the present invention.

FIG. 5 shows another embodiment of a setup page 500 for defining fields according to embodiments of the present invention. Setup page 500 may be used for defining advanced features for fields. A General Options section 502 defines the field that is being defined. As shown, a field label 508, "First Name", will be displayed with a field that a user can enter a search term in. This field may be searching for a first name attribute of business objects 202.

A Display Options section 504 allows a user to define display options. For example, the field may be displayed as a checkbox or as translate values (e.g., dropdown menus).

A Search Operators section 506 allows a user to define search operators. For example, the search may be "A first name that begins with _____". A user can then enter a name in the blank space and a search of names that begin with the name is performed.

Referring back to FIG. 3, in step 304, search definitions for the search process are received. The search definition allows a user to define information on how a search should be performed. The definition defines which business objects may be searched. Also, the search definition includes defining roles, dependencies between roles, quick create options, and search result options.

Figure 6:
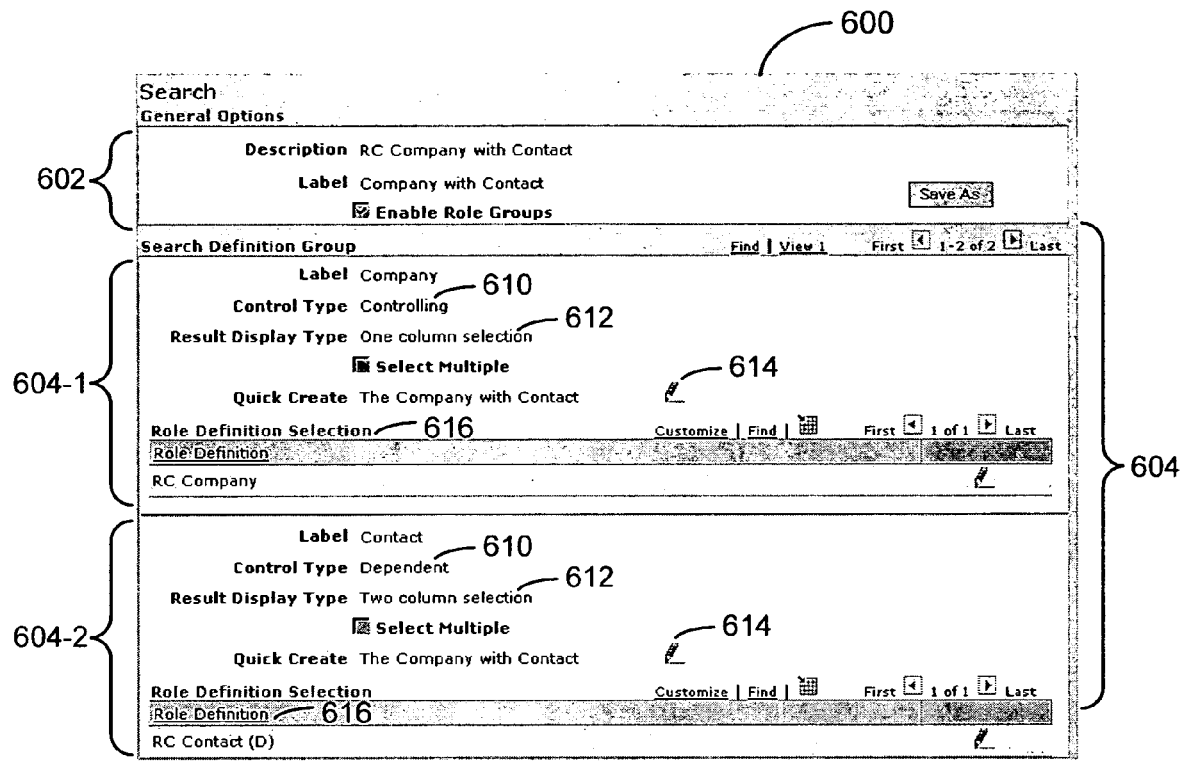
FIG. 6 depicts a search definition group setup page according to one embodiment of the present invention.

FIG. 6 depicts a search definition group setup page 600 according to one embodiment of the present invention. A General Options section 602 shows the search definition group name. This is the name of the group that can be referenced in later configuration set up pages.

A Search Definition Group section 604 allows a user to define roles that are included in the group. Group section 604 includes a first subsection 604-1 and a second subsection 604-2. Each subsection corresponds to a different role.

First section 604-1 defines a first role that is labeled "Company". A type 610 of the role can be defined. In this case, the type is controlling. This means that this role is a primary role or parent role in a relationship.

Results display type 612 allows display options for search results to be defined. In this case, the results are displayed in a single column but in other embodiments may be displayed in multiple columns.

A quick create option 614 allows a user to define if a quick create option is available. If the option is selected, a quick create option can be configured for a search result page. At runtime, the option passes search criteria information as default values to initiate creation of a business object. The business object is stored in the same data base repository that is also used by the search process. For example, the option allows a user to create a business object according to the rules of the search definition that was used to provide the search results. A user may search for a company named "M". If a business object "M" in the role of company is not found, the quick create option may be used to create a business object that is stored with the role of "Company".

Figure 7:
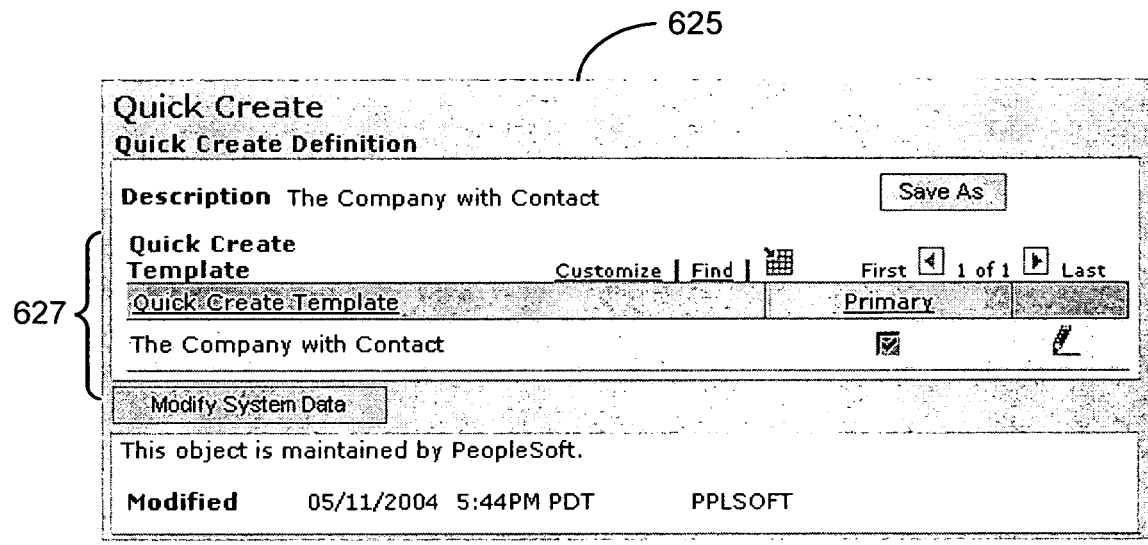
FIG. 7 shows a quick create definition setup page according to one embodiment of the present invention.

As shown in FIG. 6, a user will be able to create an entry in the quick create definition group called "The Company with Contact". FIG. 7 shows a quick create definition setup page 625 according to one embodiment of the present invention. A template is used to configure the quick create definition. As shown in section 627, a template "The Company with Contact" is assigned to this quick create definition.

Figure 8:
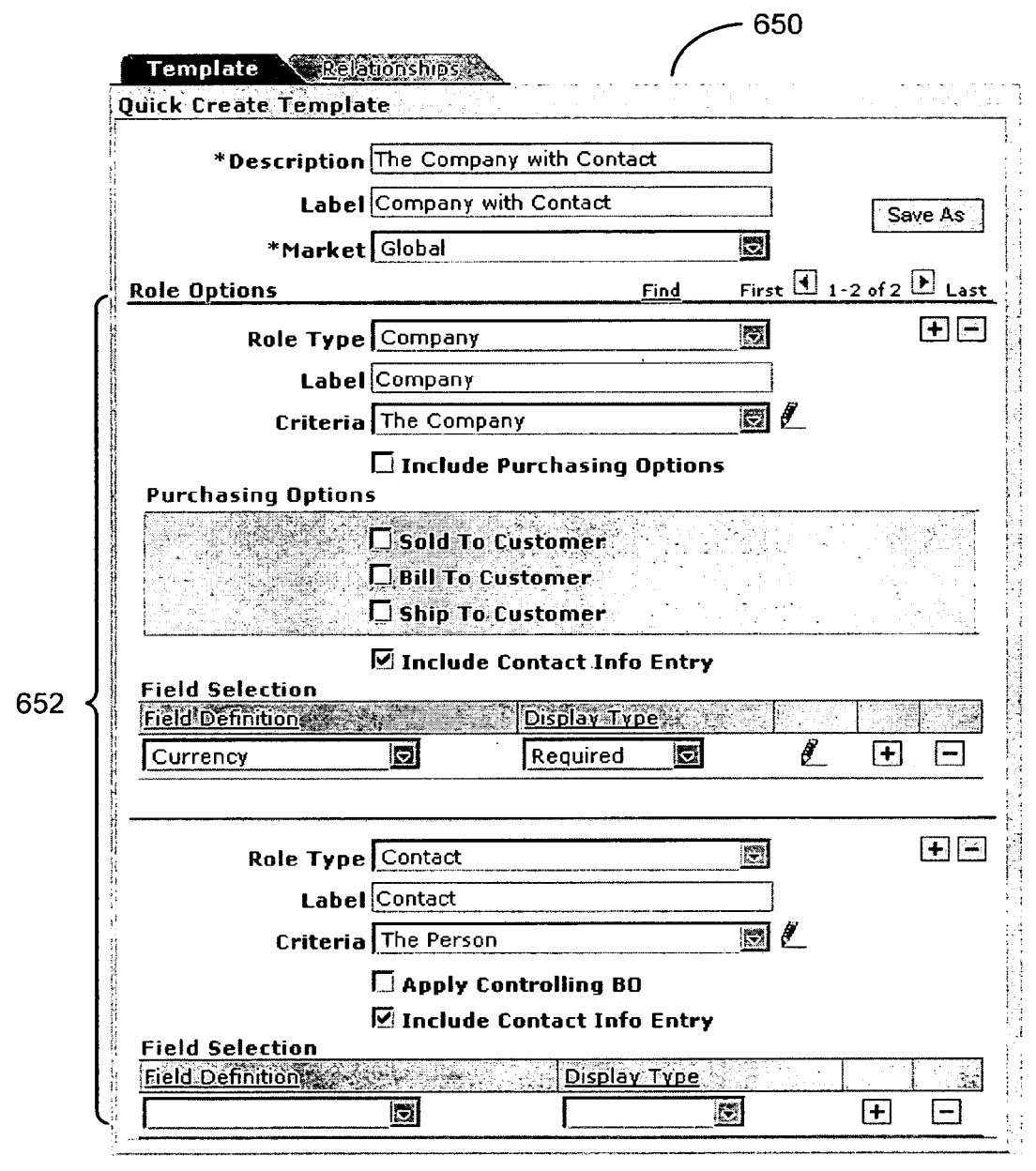

FIG. 8 depicts a quick create template definition set up page 650 according to one embodiment of the present invention. This page allows a user to define how a created business object will be stored. A Role Options section 652 allows a user to define attributes for a business object that can be created using the quick create option. As shown, business objects may be created with two roles, Company and Contact. A relationship between the two roles may also be defined in setup page 650. A created business object will be stored with the attributes defined in page 650.

Referring back to FIG. 6, a Role Definition section 616 allows a user to define a role for a label. In this case, the role is "RC Company". This means business objects with the role "RC Company" are searched when this search definition is used.

A second section 604-2 defines a second role that is labeled "Contact". A control type 610 of the role is defined as dependent. This means that this role is dependent on the controlling role. Search results for the controlling business objects will also allow a user to select a controlling business object and have dependent search results displayed.

Results display type 612 is defined as a two column selection. A quick create option 614 is defined such that a user will be able to create an entry in the search definition group called "The Company with Contact". A role definition section 616 is defined as "RC Contact".

Accordingly, the search definition includes two roles that are related (although two roles are described, it will be recognized that any number of relationships may be defined). In this case, one role is dependent upon the other.

A stepped search is thus configured by the relationship where a business object associated with the first role is returned as a search result and can be used to display related business objects associated with the second role. As will be discussed below, different display options for the controlling/dependent search results can be configured. For example, a tabbed interface may be provided that includes controlling and dependent stepped search results on separated tabs.

FIG. 9 depicts a role setup page 700 according to an embodiment of the present invention. A General Options section 702 shows general information about the role, such as the name, relationships, quick create template used, etc. This role is a contact role and is related to a company role.

A Used in Search Definitions section 704 shows which search definitions use this search role. As shown, four search definitions are using this role.

A Field Selection section 706 allows a user to select fields that can be searched upon using the relationship defined in 702. A related BO column 708 allows a user to search a field using the related role that is defined in the relationship type in section 702 (e.g., the name field may be used to search contacts for a company). A Search column 710 allows a user to select fields where a search can be performed using the role. A Result column 712 allows a user to select which attributes of business objects are displayed for the search results.

Referring back to FIG. 3, in step 306, the defined search definition groups are associated with fields. The associated search definition is used when a search is performed with a field. For example, a role in the search definition is searched along with any roles found in defined relationships. Also, the search results are displayed according to how the search results are defined in the search definition.

FIG. 10 shows a search definition selection setup page 800 according to one embodiment of the present invention. A search definition section 802 shows the available search definitions that can be associated with fields. As shown, five search definitions labeled search definition 1, 2, . . . , 5 are provided.

A Field Selection section 804 allows a user to associate search definitions with fields. A first column 806 shows the fields defined for a search process. A search definition section 808 allows a user to select which search definitions are associated with which fields. As shown, check boxes are provided where a user checks which search definitions are associated with which fields. Although this method is shown, it will be understood that other methods of associating search definitions with fields may be contemplated. Each column, labeled "Enable Search 1", "Enable Search 2", . . . , "Enable Search 5" corresponds to search definitions 1-5, respectively, in section 602. Thus, for example, the field "Name" has the check box "Enable Search 1" checked and is thus associated with the search definition "RC Company with Contact" under Search Definition 1. This means that the search definition "RC Company with Contact" is used when a search for the Name field is performed in a search page.

Referring back to FIG. 3, in step 308, a search process is created using the information received in steps 302-306. The search process can now be used in order to search business objects. The process of performing a search and the interfaces outputted during the search will now be described.

Figure 11:
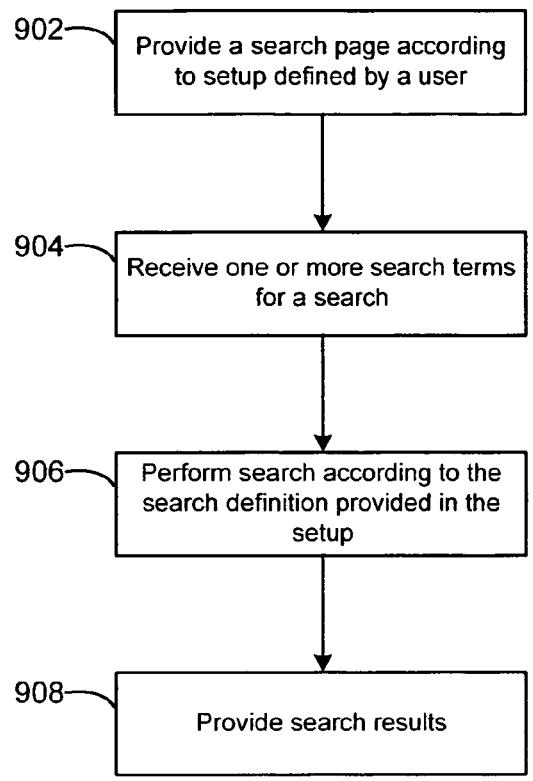
FIG. 11 depicts a simplified flowchart of a method for performing a search using a search process defined by a user according to one embodiment of the present invention.

FIG. 11 depicts a simplified flowchart 900 of a method for performing a search using a search process defined by a user according to one embodiment of the present invention. In step 902, a search page is provided as defined by the user in the setup pages. The search page may include a plurality of fields. A searcher may enter search terms in the fields for a search. Depending on the fields searched, different searches may be performed.

In step 904, a search term is received. For example, a searcher may type a search term into a field and select a search option.

In step 906, a search is performed according to the search definition associated with the field defined in the setup. For example, the search definition defined roles that are associated with fields. The role(s) associated with the field(s) are then searched.

In step 908, the search results are provided according to the search definition defined in the setup. For example, the search results are formatted as defined. Also, stepped search results may be provided that allow a user to select a search result and have dependent search results returned. Further, a quick create option may be provided that allows a searcher to create a business object according to the search definition. These features will be described in more detail below with reference to relevant search result pages.

Figure 12:
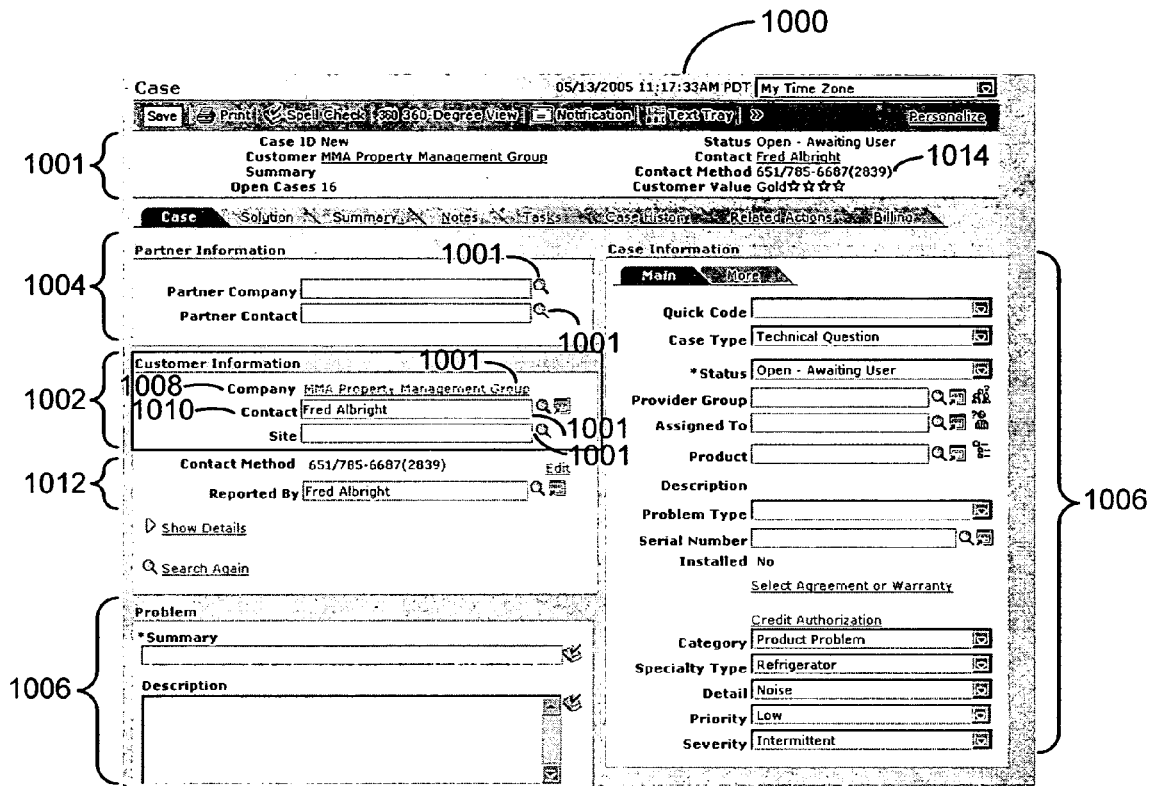
FIG. 12 depicts a search page according to one embodiment of the present invention.

FIG. 12 depicts a search page 1000 according to one embodiment of the present invention. Page 1000 may be a page that is used by an end user or searcher, such as a customer service agent. Page 1000 allows a searcher to enter a problem into a customer service system. The searcher may be fielding a call from a customer named Fred Albright and may want to open a case for the call. General information about the case is shown in section 1001. This information may be searched for using page 1000. For example, contact information for Fred Albright may be needed to open the case.

The searcher may use fields in page 1000 to search for Fred Albright's contact information. As shown, a Customer Information section 1002 and a Partner Information section 1004 include fields 1001. In one embodiment, setup page 400 in FIG. 4 is used to generate a company field 1008 shown in section 1002. As shown, the label for the field is "Company" and the entry in the field is turned into a hyperlink. As defined in FIG. 4, business objects with the role of Company are searched using the entry provided in the field. Thus, "MMA Property Management Group" will be used to search business objects with the role of Company. A contact field 1010 is also created using setup page 400.

Other search terms may be entered in other fields also. As shown, the name "Fred Albright" is entered in the Contact field 1010. In this case, contact may be a role that is dependent on a Company field 1008. Thus, business objects with a role of contact that are related to the company MMA Property Management Group are searched using the term Fred Albright.

A Search Result section 1012 shows the results of the search as being a phone number for Fred Albright. Additionally, the contact information may be inputted in a contact method entry 1014 in section 1001.

Note section 1006 allows a searcher to enter notes. For example, the searcher may enter in a problem description and other relevant information using section 1006.

FIG. 13 depicts another search page 1100 according to one embodiment of the present invention. As shown, advanced search features may be provided, such as Boolean operators that can be used in a search. These advanced features may be performed for any fields shown in search page 1100.

Using page 1100, a searcher can perform searches using fields found in Search section 1102. As shown, a search for the letter "M" is performed in a field 1104. The search is searching for companies that begin with the letter M. In one embodiment, as was defined in the set up pages, business objects 202 associated with the role of Company are searched.

A Search Results section 1104 shows the results of the search. As shown, companies that start with "M" are shown. In a section 1108, other information for the companies is provided. The information that is shown is as defined in FIG. 9, section 706, where a user checked the fields that should be shown for search results. In this case, address, city, state, postal, country and phone number information are shown for each company.

A quick create option 1106 allows a user to create an entry. The entry is created and stored according to the search definition for the field. In this example, the entry can be created according to rules defined in the search definition section of "Company with Contact". In this case, the searcher can create a business object with the role of company and/or a business object with the role of contact. For example, only a company can be created, a company can be created with a contact, or a contact can be added to one of the companies shown in section 1104.

The quick create option is found on the search results page. This allows a user to add a company without leaving the search page. Conventionally, a user would have to go to a different page that is configured for entering information in a database. This page was separate from the search page. Thus, a search definition Company with Contact would have to be created and then the entry could be added. This, however, is inconvenient and inefficient.

Figure 14:
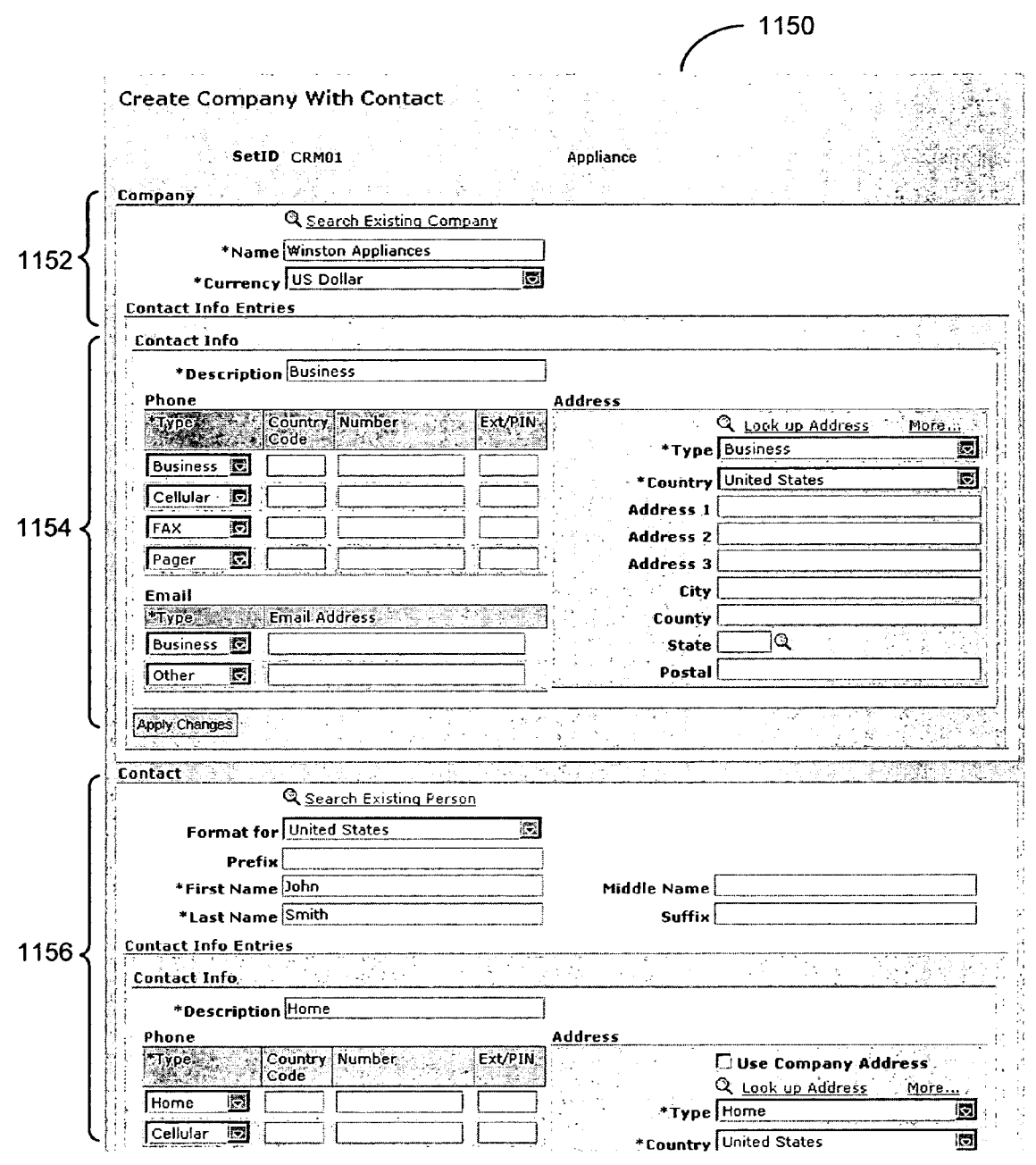

When the quick create option is selected, as shown in FIG. 14, a quick create page 1150 is outputted that allows a user to enter an entry. The entry is then classified according to the rules defined in the Company with Contact quick create definition. This is convenient and allows a user to create entries while using the search process.

As shown in Company section 1152, a company may be entered. In a Contact Info Entries section 1154 may be used to enter contact information for the company. A created business object will have a company role as defined in quick create template setup page 650.

A Contact section 1156 allows a user to enter a contact for the company entered in section 1152. Any number of contacts can be entered in section 1156. These contacts will have a contact role as defined in the quick create template setup page 650. Also, the contacts will be related to the company defined in section 1152. The entries in sections 1152 and 1156 are then stored. Thus, business objects with the company role and/or contact role can be created from a search page searching for business objects with the company and/or contact role.

A stepped search process is also provided. Search results 1110 and 1112 may be selected and business objects that are related are returned. As defined in FIG. 6, roles that are related to one another are defined. In FIG. 6, a contact role is dependent on a company role. For example, the contacts for a company are defined as being related. The stepped search process allows a user to select a company search result and have related contacts for the company returned.

Figure 15:
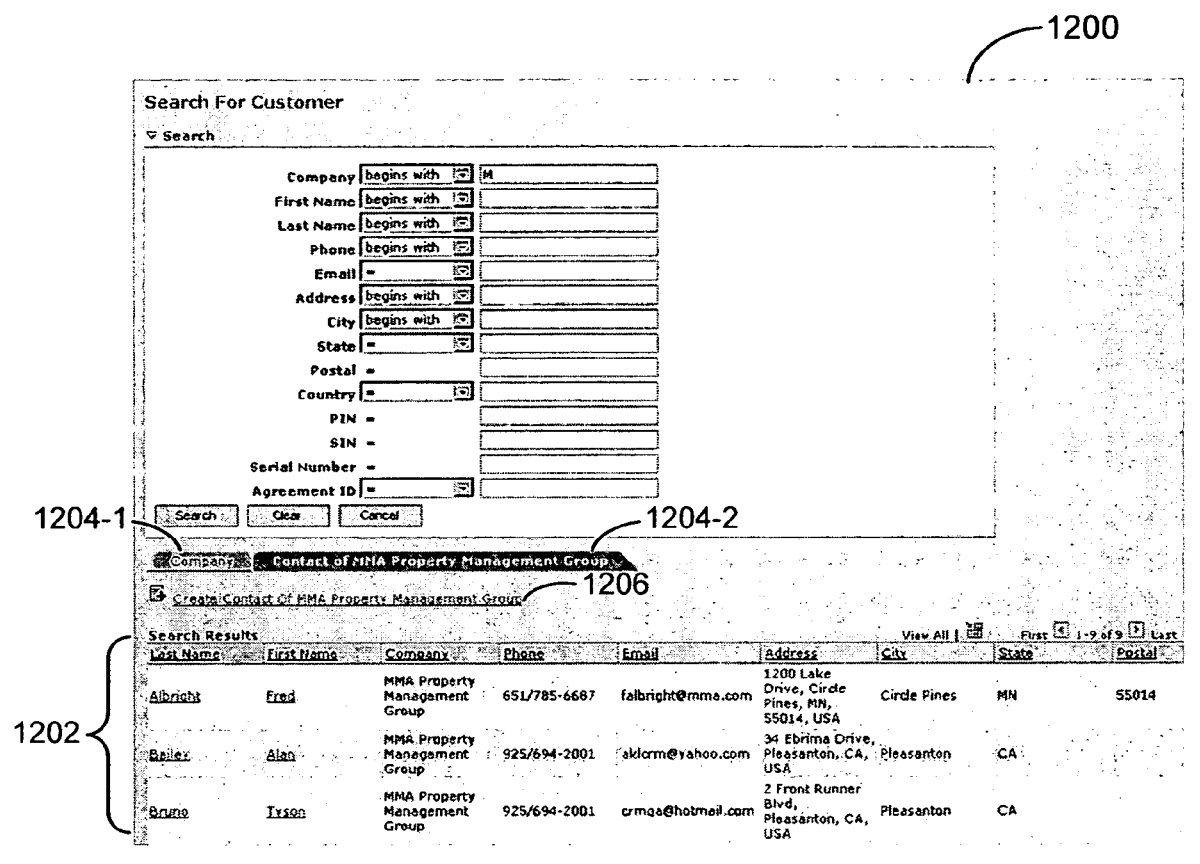

FIG. 15 shows a page 1200 with the stepped search results shown according to one embodiment of the present invention. If the company "MMA Property Management Group" is selected in FIG. 13, search results defined as being dependent on the company are returned. For example, Search Results section 1202 shows contacts for the company.

The stepped search results may be organized using tabs 1204. Tabs 1204-1 and 1204-2 allow a user to switch between the stepped search results. If a searcher selects tab 1204-1, the search results for the companies are shown. When a company is selected, the contacts for the selected company are shown under tab 1204-2. This provides an efficient way to display stepped search results.

A quick create option 1206 allows a user to create an entry in the search definition "Contact of MMA Property Management Group". In this case, the searcher can create a business object as a contact for the MMA Property Management Group business object. The entry is then classified according to the rules defined in the Contact of Company section of the quick create definition. For example, a business object that is a contact of MMA Property Management Group may be created. This is convenient and allows a user to create entries while using the search process.

Figure 16:
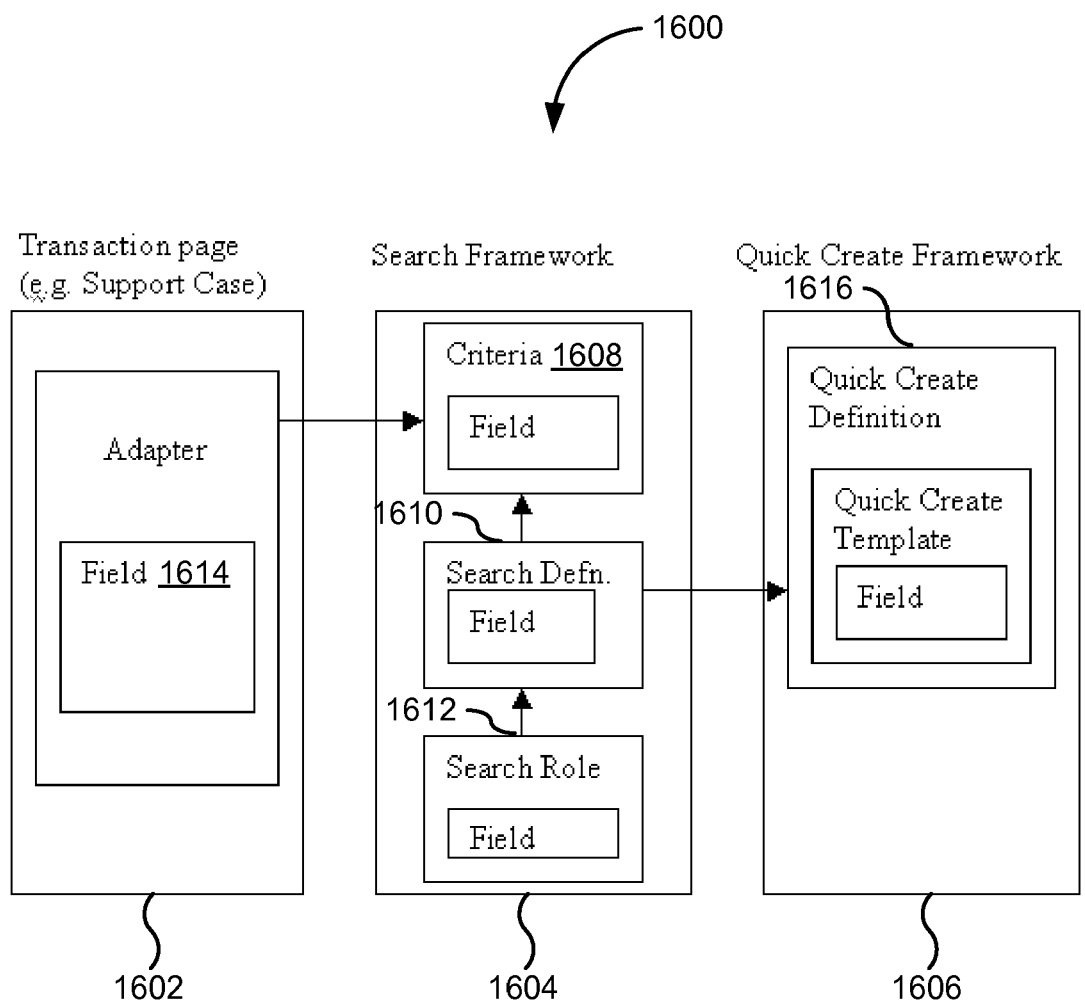
FIG. 16 depicts a system showing integration of a search framework and a quick create framework according to embodiments of the present invention.

FIG. 16 depicts a system 1600 showing integration of a search framework and a quick create framework according to embodiments of the present invention. As shown, a transaction page 1602, search framework 1604, and a quick create framework 1606 is provided in system 1600. Transaction page 1602 may be a page displayed on search client 108. Search framework 1604 and quick create framework 1606 may be found in search system 102. System 1600 shows the relationship between modules that are used in the above setup pages.

Page 1602 includes a search section, such as section 1002 shown in FIG. 12. Also, a field 1614 can be any field, such as fields 1008 and 1010 shown in FIG. 12.

Search framework 1604 includes a criteria module 1608, a search definition module 1610, and a search role module 1612. Criteria module 1608 outputs setup page 800 as shown in FIG. 10. Fields are associated with search definitions using criteria module 1608. Search definition module 1610 outputs search definition setup page 600 as shown in FIG. 6. Roles and relationships between roles are defined using search definition module 1610. Search role module 1610 outputs search role setup page 700 as shown in FIG. 9. The search role is defined using search role module 1612.

Quick create framework 1604 includes a quick create definition module 1616. Module 1612 coordinates the configuring of a quick create option. A quick create template 650 is output by module 1612 and can be used to configure the quick create option.

As shown, search framework 1604 and quick create framework 1606 are integrated in a common framework. A search using field 1614 is defined using search framework 1604. A quick create definition for field 1614 can also be defined. Field 1614 is then output on page 1602 and can be used to search for business objects. The search is then performed according to how the search is defined in search framework 1604. Because quick create framework 1606 is linked to search framework 1604, creating business objects is enabled while performing a search using field 1614. This integration allows a user to create business objects from a search results page without opening a new program that is used to create business objects for the database. Also, the quick create template allows a business object to be created and stored according to the rules that were defined.

Accordingly, embodiments of the present invention allow a user to configure a search process. The search process is flexible and can be reconfigured as business needs change. A user interface is provided that allows a user to configure the search without making coding changes. This is very convenient and allows easy configuration.

The search process also provided search results that are stepped. The stepped results can be configured such that dependent business objects can be displayed when a controlling business object is selected. The display configuration of the stepped results can also be configured, such as tabs can be used to display the results.

A quick create option is also provided in a search results page. The quick create option allow a user to create a business object from the search result page. The business entity is then stored according to a quick create definition.

Figure 17:
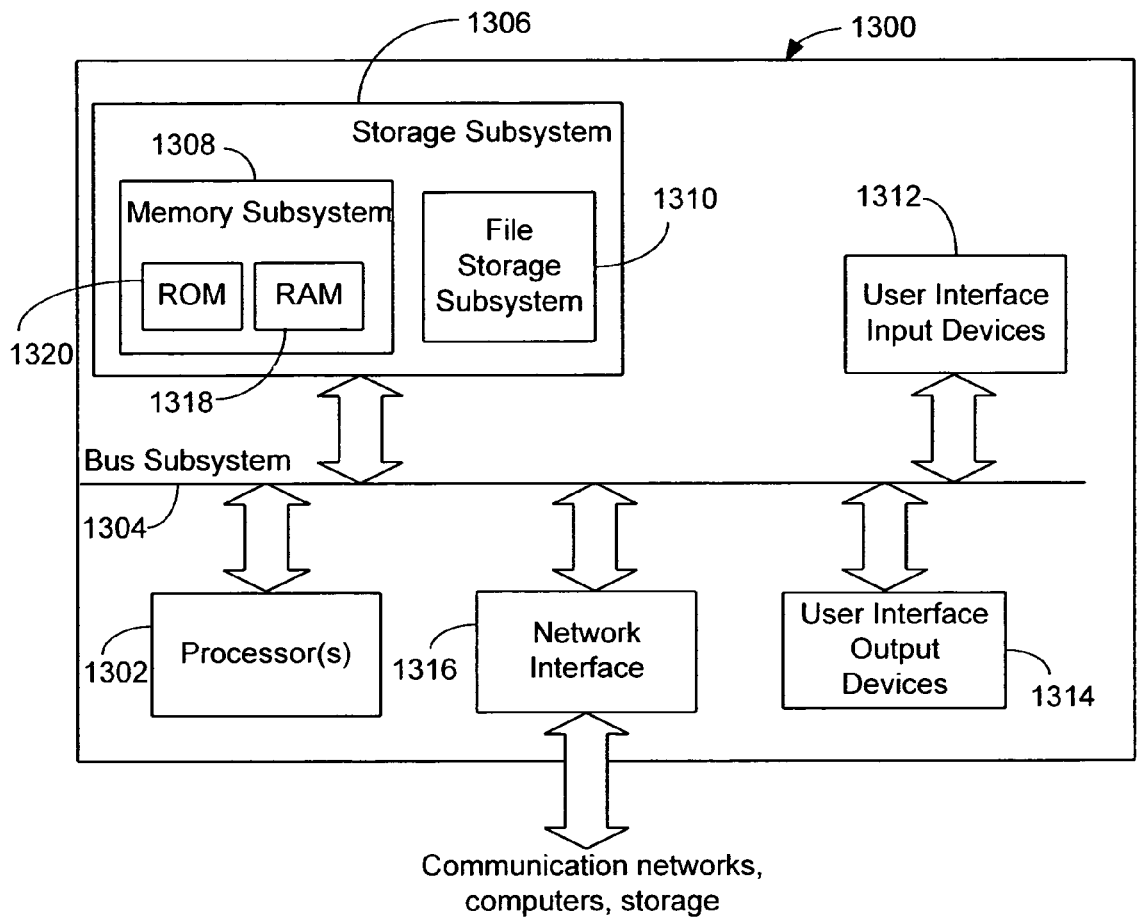
FIG. 17 is a simplified block diagram of data processing system that may be used to perform processing according to an embodiment of the present invention.

FIG. 17 is a simplified block diagram of data processing system 1300 that may be used to perform processing according to an embodiment of the present invention. As shown in FIG. 17, data processing system 1300 includes at least one processor 1302, which communicates with a number of peripheral devices via a bus subsystem 1304. These peripheral devices may include a storage subsystem 1306, comprising a memory subsystem 1308 and a file storage subsystem 1310, user interface input devices 1312, user interface output devices 1314, and a network interface subsystem 1316. The input and output devices allow user interaction with data processing system 1302.

Network interface subsystem 1316 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 1316 serves as an interface for receiving data from other sources and for transmitting data to other sources from data processing system 1300. Embodiments of network interface subsystem 1316 include an Ethernet card, a modem (telephone, satellite, cable, ISDN, etc.), (asynchronous) digital subscriber line (DSL) units, and the like.

User interface input devices 1312 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 1300.

User interface output devices 1314 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 1300.

Storage subsystem 1306 may be configured to store the basic programming and data constructs that provide the functionality of the present invention. For example, according to an embodiment of the present invention, software modules implementing the functionality of the present invention may be stored in storage subsystem 1306. These software modules may be executed by processor(s) 1302. Storage subsystem 1306 may also provide a repository for storing data used in accordance with the present invention. Storage subsystem 1306 may comprise memory subsystem 1308 and file/disk storage subsystem 1310.

Memory subsystem 1308 may include a number of memories including a main random access memory (RAM) 1318 for storage of instructions and data during program execution and a read only memory (ROM) 1320 in which fixed instructions are stored. File storage subsystem 1310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1304 provides a mechanism for letting the various components and subsystems of data processing system 1302 communicate with each other as intended. Although bus subsystem 1304 is shown schematically as a single bus, alternative embodiments of the bus subsystem may utilize multiple busses.

Data processing system 1300 can be of varying types including a personal computer, a portable computer, a workstation, a network computer, a mainframe, a kiosk, or any other data processing system. Due to the ever-changing nature of computers and networks, the description of data processing system 1300 depicted in FIG. 13 is intended only as a specific example for purposes of illustrating the preferred embodiment of the computer system. Many other configurations having more or fewer components than the system depicted in FIG. 17 are possible.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method for providing search results, the method comprising:

generating, with one or more processors associated with one or more computer systems, information configured for displaying a first search setup page in one or more search setup pages, the first search setup page having functionality that enables users of the first search setup page to create field definitions for search pages;

receiving, at the one or more computer systems, information provided by a user of the first search setup page in the one or more search setup pages defining one or more input fields for a search page, the one or more input fields defined to receive one or more search terms;

generating, with the one or more processors associated with the one or more computer systems, information configured for displaying a second search setup page in the one or more search setup pages, the second search setup page having functionality that enables users of the second search setup page to create search definitions for the field definitions;

receiving, at the one or more computer systems, information provided by a user of the second search setup page in the one or more search setup pages defining a plurality of search definitions each search definition including:
   information specifying how a search is to be performed in response to one or more search terms entered into an associated input field, and
   information specifying how results of the search are to be output in response to the one or more search terms entered into the associated input field;

generating, with the one or more processors associated with the one or more computer system, information configured for displaying a third search setup page in the one or more search setup pages, the third search setup page displaying the field definitions and the search definitions for the field definitions, the third search setup page further having functionality that enables users of the third search setup page to specify how multiple search definitions apply to individual field definitions;

receiving, at the one or more computer system, information provided by a user of the third search setup page in the one or more search setup pages associating at least two of the plurality of search definitions with at least one input field in the one or more input fields of the search page;

receiving, at the one or more computer systems, information configured for displaying the search page;

receiving, at the one or more computer systems, a search term entered into the at least one input field in the one or more input fields of the search page;

determining, with the one or more processors associated with the one or more computer systems, a first search definition associated via the third search setup page in the one or more search setup pages with the at least one input field in the one or more input fields of the search page and a second search definition associated via the third search setup page in the one or more setup pages with the at least one input field in the one or more input fields of the search page;

determining, with one or more processors associated with the one or more computer systems, a first set of one or more objects related to the search term entered into the at least one input field based on the first search definition associated with the at least one input field, the first search definition further specifying at least one role;

determining, with one or more processors associated with the one or more computer systems, a second set of one or more objects related to the search term entered into the at least one input field based on the second search definition associated with the at least one input field, the second search definition further specifying at least one role; and generating, with the one or more processors associate with the one or more computers systems, information configured for displaying the first set of one or more objects along with the second set of one or more objects.

2. The computer-implemented method of claim 1, further comprising receiving, at the one or more computer systems, information specifying one or more relationships between roles of objects.

3. The computer-implemented method of claim 2, wherein at least one relationship in the one or more relationships defines a first role and a second role that is dependent on the first role.

4. The computer-implemented method of claim 3, wherein the first set of one or more objects comprises a first set of objects associated with the first role and the second set of objects comprises a second set of objects associated with the second role, the method further comprising:

generating, with the one or more processors associated with the one or more computer systems, information configured for displaying, the first set of objects associated with the first role as search results under a first tab associated with the first role; and generating, with the one or more processors associated with the one or more computer systems, information configured for displaying, the second set of objects associated with the second role as search results under a second tab associated with the second role.

5. The computer-implemented method of claim 4, further comprising:

receiving, at the one or more computer systems, a selection of an object in the first set of objects; and generating, with the one or more processors associated with the one or more computer systems, information configured for displaying only objects under the second tab associated with the second role from the second set of objects that are dependent on the selected object in the first set of objects.

6. The computer-implemented method of claim 1, further comprising:

generating, with the one or more processors associated with the one or more computer systems, information configured for displaying a quick create option with the first and second sets of objects, the quick create option allowing a user to create an object from the search page with at least the role associated with the first or second search definition.

7. A search framework that allows a user to configure a search process, the search framework comprising:

a field setup page having functionality that enables users of the field setup page to create field definitions for search pages;

a search definition setup page having functionality that enables users of the search definition setup page to create search definitions for the field definitions each search definition including information specifying how a search is to be performed in response to input entered in an associated search term input field and information specifying how results of the search are to be output in response to the input entered in the associated search term input field, wherein each search definition is associated with a role;

a search association setup page configured to present to users of the search association page the field definitions and available search definitions for the field definitions, the search association setup page further having selection options for each of the available search definitions that when selected by the users associate multiple selected ones of the available search definitions with search term input field of search pages; and a non-transitory storage medium configured to store at least the field setup page, the search definition setup page, and the search association setup page;

wherein one or more computer systems are configured based on at least the field setup page, the search definition setup page, and the search association setup page to:

receive information provided by a user of the field setup page defining one or more search term input fields for a search page, receive information provided by a user of the search definition setup page defining a plurality of search definitions, receive information provided by a user of the search definition setup page associating at least two of the plurality of search definitions with at least one search term input field of the search page;

receive a search term entered into the at least one search term input field of the search page;

determine a first search definition associated via the search definition setup page with the at least one search term input field and a second search definition associated via the search definition setup page with the at least one search term input field;

determine a first set of one or more objects related to the search term entered into the at least one search term input field based on the first search definition associated with the at least one search term input field, the first search definition specifying at least one role;

determine a second set of one or more objects related to the search term entered into the at least one search term input field based on the second search definition associated with the at least one search term input field, the second search definition specifying at least one role; and generate information configured for displaying the first set of one or more objects along with the second set of one or more objects.

8. The framework of claim 7, wherein the search definition setup page is configured to allow the user to define relationships between roles.

9. The framework of claim 8, wherein a relationship defines a first role and a second role that is dependent on the first role.

10. The framework of claim 9, wherein the search definition setup page is configured to allow the user to define a visual representation that displays a first set of objects as search results associated with the first role, wherein a dependent set of objects associated with the second role as search results is displayed when an object in the first set of objects is selected.

11. The framework of claim 9, wherein the search definition setup page is configured to allow the user to define a first tab that displays search results for the first role and a second tab that displays search results for the second role.

12. The framework of claim 7, wherein the search definition page is configured to allow the user to specify whether a quick create option is available on a search result page returned for a search, the quick create option allowing the user to create an object from the search result page with the role associated with the search definition.

13. The framework of claim 7, wherein the search definition setup page allows the user to define one or more attributes to be returned for objects in the search results.

14. The framework of claim 7, wherein the search page is created using the one or more fields, the search page allowing a searcher to perform the search on the search page using the field.

15. The framework of claim 7, wherein the search definition setup page allows a user to define how search results returned for a search using the field are formatted in the information specifying how results of the search in response to the input associated with the field are to be output.

16. A non-transitory information storage medium storing a plurality of instructions for providing search results when executed by a processor of a computer system, the information storage medium comprising:

code for providing a graphical user interface that outputs a first search setup page in one or more search setup pages, the first search setup page having functionality that enables users of the first search setup page to create field definitions for search pages;

code for receiving via the first search setup page in the one or more search setup pages information defining one or more input fields for a search page, the one or more input fields defined to receive one or more search terms;

code for providing a graphical user interface that outputs a second search setup page in one or more search setup pages, the second search setup page having functionality that enables users of the second search setup page to create search definitions for the field definitions;

code for receiving via the second search setup page in the one or more search setup pages information defining a plurality of search definitions each search definition including information specifying how a search is to be performed in response to one or more search terms entered into an associated input field and information specifying how results of the search are to be output in response to the one or more search terms entered into the associated input field;

code for providing a graphical user interface that outputs a third search setup page in the one or more search setup pages, the third search setup page displaying the field definitions and the search definitions for the field definitions, the third search setup page further having functionality that enables users of the third search setup page to specify how multiple search definitions apply to individual field definitions;

code for receiving via the third search setup page in the one or more search setup pages information associating at least two of the plurality of search definitions with at least one input field in the one or more input fields of the search page;

code for receiving a search term for the at least one input field in the one or more input fields of the search page;

code for determining a first search definition associated with the at least one input field of the search page;

code for determining a second search definition associated with the at least one input field of the search page;

code for determining a first set of one or more objects related to the search term for the at least one input field based on the first search definition associated with the at least one input field, the first search definition further specifying at least one role; and code for determining a second set of one or more objects related to the search term for the at least one input field based on the second search definition associated with the at least one input field, the second search definition further specifying at least one role; and code for causing the first set of one or more objects to be displayed along with the second set of one or more objects.

17. The information storage medium of claim 16, further comprising code for receiving information specifying one or more relationships between roles of objects.

18. The information storage medium of claim 17, wherein at least one relationship in the one or more relationships defines a first role and a second role that is dependent on the first role.

19. The information storage medium of claim 18, wherein the first set of one or more objects comprises a first set of objects associated with the first role and the second set of one or more objects comprise a set of objects associated with the second role, the information storage medium further comprising:

code for displaying the first set of objects associated with the first role as search results under a first tab associated with the first role; and code for displaying the second set of objects associated with the second role as search results under a second tab associated with the second role.

20. The information storage medium of claim 19, further comprising:

code for receiving a selection of an object in the first set of objects; and code for displaying only objects under the second tab associated with the second role from the second set of objects that are dependent on the selected object in the first set of objects.

21. The information storage medium of claim 16, further comprising code for displaying a quick create option with the first and second sets of objects returned for the search, the quick create option allowing a user to create an object from a page displaying search results with at least the role associated with the first or second search definition.

* * * * *

UNITED STATES PATENT AND TRADEMARK OFFICE
CERTIFICATE OF CORRECTION

PATENT NO. : 7,877,386 B2
APPLICATION NO. : 11/153693
DATED : January 25, 2011
INVENTOR(S) : Shurtleff et al.

It is certified that error appears in the above-identified patent and that said Letters Patent is hereby corrected as shown below:

In the claims

In column 12, line 4, in claim 1, delete "definitions" and insert -- definitions, --, therefor.

In column 13, line 5, in claim 4, delete "displaying," and insert -- displaying --, therefor.

In column 13, line 10, in claim 4, delete "displaying," and insert -- displaying --, therefor.

In column 13, line 39, in claim 7, delete "definitions" and insert -- definitions, --, therefor.

In column 15, line 14, in claim 16, delete "definitions" and insert -- definitions, --, therefor.

Signed and Sealed this
Sixth Day of October, 2015

Michelle K. Lee
*Director of the United States Patent and Trademark Office*